United States Patent
Lin

(10) Patent No.: US 9,750,108 B2
(45) Date of Patent: Aug. 29, 2017

(54) LIGHT EMITTING DIODE (LED) TORCHIERE LAMP WITH OVERHEAT AND OVERVOLTAGE PROTECTION FUNCTIONS

(71) Applicant: Modern Home Lighting Inc., Dongguan, Guangdong (CN)

(72) Inventor: Shih-Ming Lin, Changhua County (TW)

(73) Assignee: MODERN HOME LIGHTING INC., Dongguan, Guangdong Province (CN)

(*) Notice: Subject to any disclaimer, the term of this patent is extended or adjusted under 35 U.S.C. 154(b) by 76 days.

(21) Appl. No.: 14/677,516

(22) Filed: Apr. 2, 2015

(65) Prior Publication Data
US 2016/0295647 A1 Oct. 6, 2016

(51) Int. Cl.
H05B 33/08 (2006.01)

(52) U.S. Cl.
CPC .......... *H05B 33/089* (2013.01); *Y02B 20/341* (2013.01)

(58) Field of Classification Search
CPC ............ H05B 33/0815; H05B 33/0827; H05B 33/0812; H05B 33/083; H05B 33/0845; H05B 33/0821; H05B 33/0851; H05B 33/0854; H05B 33/089; H05B 33/0884; H05B 33/0875
See application file for complete search history.

(56) References Cited

U.S. PATENT DOCUMENTS

| | | | |
|---|---|---|---|
| 2007/0273290 A1* | 11/2007 | Ashdown | F21V 29/004 315/113 |
| 2009/0195170 A1* | 8/2009 | Pai | H05B 33/0815 315/201 |
| 2012/0033429 A1* | 2/2012 | Van De Ven | H05B 33/0803 362/294 |

* cited by examiner

*Primary Examiner* — Jany Richardson
(74) *Attorney, Agent, or Firm* — Muncy, Geissler, Olds & Lowe, P.C.

(57) ABSTRACT

The present invention discloses an LED torchiere lamp with overheat and overvoltage protection functions. The LED torchiere lamp includes primarily a high-voltage rectifying circuit which rectifies high-voltage alternating current as high-voltage direct current, and an IC drive circuit. The IC drive circuit is built in with an electronic switching circuit to drive the LED lamp, an analog light dimmer circuit and a PWM light dimmer circuit, in addition to an overheat and overvoltage protection circuit which is used to improve the safety of and extend the lifetime of usage of the LED torchiere lamp, thereby having the practicality.

3 Claims, 8 Drawing Sheets

LIGHT EMITTING DIODE (LED) TORCHIERE LAMP WITH OVERHEAT AND OVERVOLTAGE PROTECTION FUNCTIONS

BACKGROUND OF THE INVENTION (a) Field of the Invention

The present invention relates to an LED (Light Emitting Diode) torchiere lamp with overheat and overvoltage protection functions, and more particularly to a torchiere lamp which includes a high-voltage input power source combining with an IC (Integrated Circuit) drive circuit without using a transformer and an electrolytic capacitor, and is provided with an overheat and overvoltage protection circuit, such that the safety of the LED torchiere lamp can be improved and the lifetime of usage of the LED lamp can be extended, thereby having the practicality.

(b) Description of the Prior Art

Most of the conventional torchiere lamps use halogen bulbs which may burn people who use the lamps or cause fire to endanger lives and properties. Therefore, an overheat de-energizing circuit needs to be provided to pause the operation of the halogen bulb, which will affect the effect of lighting and the safety. Although there are the LED torchiere lamps afterward, a conventional LED torchiere lamp uses high-voltage alternating current of 100V-240V as the power source, as shown in FIG. 1; therefore, a voltage reduction technology should be used to acquire lower voltage, wherein a transformer or a switching mode power supply is normally used to reduce the voltage, and then the AC (Alternating Current) current is converted to DC (Direct Current) current which is converted in turn to a constant source of DC current, thereby making the LED source to illuminate. However, a conventional AC-to-DC conversion system is large in size and has high loss to increase the cooling cost considerably, which shortens the lifetime of usage of the LED lamp greatly.

Accordingly, the present invention discloses an LED torchiere lamp that operates without using the conventional AC-to-DC conversion system and the electrolytic capacitor to extend the lifetime of usage significantly and increase the safety.

SUMMARY OF THE INVENTION

The primary object of the present invention is to disclose an LED torchiere lamp with overheat and overvoltage protection functions, and more particularly to a torchiere lamp which includes a high-voltage input power source combining with an IC drive circuit without using a transformer and an electrolytic capacitor, providing constant current to drive the LED lamp. The LED torchiere lamp is also provided with an overheat and overvoltage protection circuit to improve the safety and extend the lifetime of usage, thereby having the practicality.

To achieve the abovementioned object, the present invention discloses an LED torchiere lamp with overheat and overvoltage protection functions, including primarily a high-voltage rectifying circuit which rectifies high-voltage alternating current as high-voltage direct current. The functions of major elements of the high-voltage rectifying circuit are described below:

1. F1—a fuse (250/1A), which permits automatic shut-off to protect the circuit when a subsequent circuit is short-circuited;
2. R7 and R8—two chip resistors (22R), which are used for surge (current) protection;
3. RV1—a varistor, which prevents the circuit from showing all kinds of transient voltage and absorbs the surge current;
4. D1—a chip bridge, which rectifies an AC supply mains as DC voltage;
5. D2—a chip diode, which protects the lumped circuit from ESD (Electrostatic Discharge);
6. D3, D4, D5, D6—four chip diodes, which protect each LED from ESD;
7. R1, R2, R3, R4, R5, R6—six chip resistors (15R), which modulate the current value at the IC output terminal;
8. C1, C2, C3—three chip capacitors (0.1 u), which are used as the filter capacitors at the IC supply terminal.

The pin numbers and names of the IC drive circuit of the present invention are described below:

1. VCH an overvoltage detection input terminal,
2. VSSA a common,
3. CS1 connecting to a current sensing resistor 1;
4. VSSB a ground,
5. REG5 a power source at 5V,
6. TS an overheat protection input terminal,
7. VSSB a ground,
8. CS2 connecting to a current sensing resistor 2,
9. VDIM an analog light dimmer signal input terminal,
10. PWM (Pulse Width Modulation) a PWM light dimmer signal input terminal,
11. DN8 a channel 8,
12. DN7 a channel 7,
13. DN6 a channel 6,
14. DN5 a channel 5,
15. VPP (Virtual Power Plant) a high-voltage power source,
16. VPP_ID a single-wired electronic switch power-harvesting current control terminal,
17. DN1 a channel 1,
18. DN2 a channel 2,
19. DN3 a channel 3,
20. DN4 a channel 4.

First of all, the junctions VPPA, DN1A, DN2A, DN3A, DN4 of the high-voltage rectifying circuit are connected to the junctions VPPA, DN1A, DN2A, DN3A, DN4 of the LED lamp, and the junctions of the high-voltage rectifying circuit are connected to the IC drive circuit through the chip resistors (OR) J1~J12 of the switching circuit, with the chip resistors being used for the jumper protection. The junction VPPA of the high-voltage rectifying circuit is connected to VPP1, VPP2, VPP3 of the $15^{th}$ pin of U1, U2, U3 of IC through the chip resistors J1, J5, J9, and then a high-voltage power source is introduced, connecting DN1A to the $14^{th}$ pin and the $17^{th}$ pin of U1, U2, U3 of IC through the chip resistors (OR) J2, J6, J10, wherein the $14^{th}$ pin and the $17^{th}$ pin are DN11, DN21, DN31. DN2A is connected to the $13^{th}$ pin and the $18^{th}$ pin of U1, U2, U3 of IC through the chip resistors (OR) J3, J7, J11, wherein the $13^{th}$ pin and the $18^{th}$ pin are DN12, DN22, DN32. DN3A is connected to the $12^{th}$ pin and the $19^{th}$ pin of U1, U2, U3 of IC through the chip resistors (OR) J4, J8, J12, wherein the $12^{th}$ pin and the $19^{th}$ pin are DN13, DN23, DN33. Accordingly, the high-voltage rectifying circuit can be connected to the IC drive circuit. There can be one or plural IC drive circuits depending upon the quantity of the loaded chip LED lamps. The IC drive circuit is built in with an electronic switching circuit required for driving the LED lamp, an analog light dimmer circuit and a PWM light dimmer circuit, in addition to an overheat and overvoltage protection circuit which is connected externally to R1, R2 for modulating the IC output current and to C1 for providing a stable filtering wave as supply power to IC. Constant current is provided to the LED lamp through the high-voltage rectifying current and the IC drive circuit. When the temperature of the LED lamp exceeds a temperature setting of 85~95° C., the overheat and overvoltage protection circuit starts to drop the voltage and decrease the current to cool down and reduce the brightness of the LED lamp. Therefore, the safety of the LED torchiere lamp is improved and the lifetime of usage of the LED torchiere lamp is extended, thereby having the practicality.

Another object of the present invention is to provide an LED torchiere lamp with overheat and overvoltage protection functions, wherein the overvoltage detection input terminal VCH at the $1^{st}$ pin, the overheat protection input terminal TS at the $6^{th}$ pin, the analog light dimmer signal input terminal VDIM at the $9^{th}$ pin, the PWM light dimmer signal input terminal at the $10^{th}$ pin, and the single-wired electronic switch power-harvesting current control input terminal VPP_ID at the $16^{th}$ pin, disposed on the IC drive circuit, can be optionally connected or disconnected according to the required function, thereby facilitating the versatility of the present invention.

Still another object of the present invention is to provide an LED torchiere lamp with overheat and overvoltage protection functions, wherein all the circuits and elements of the high-voltage rectifying circuit and the IC drive circuit are installed on a single PCB (Printed Circuit Board) which is disposed on a top of the torchiere lamp to reduce the area of installation.

To enable a further understanding of the said objectives and the technological methods of the invention herein, the brief description of the drawings below is followed by the detailed description of the preferred embodiments.

DETAILED DESCRIPTION OF THE PREFERRED EMBODIMENTS

Figure 1:
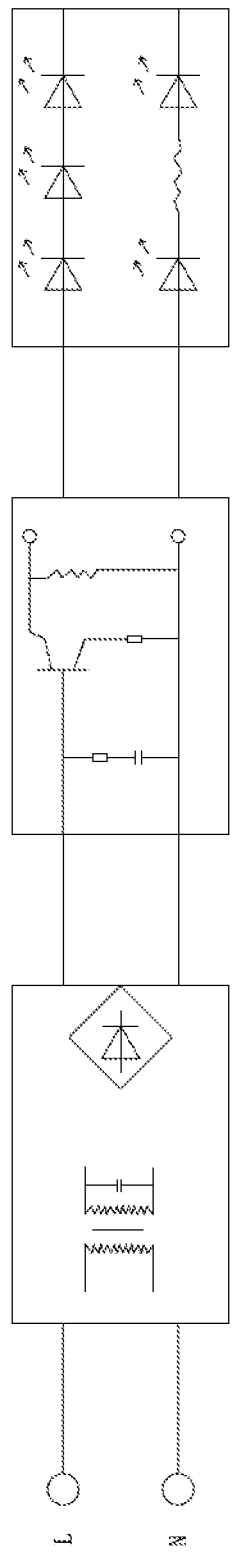
FIG. 1 shows a schematic view of a prior art.
Figure 2:
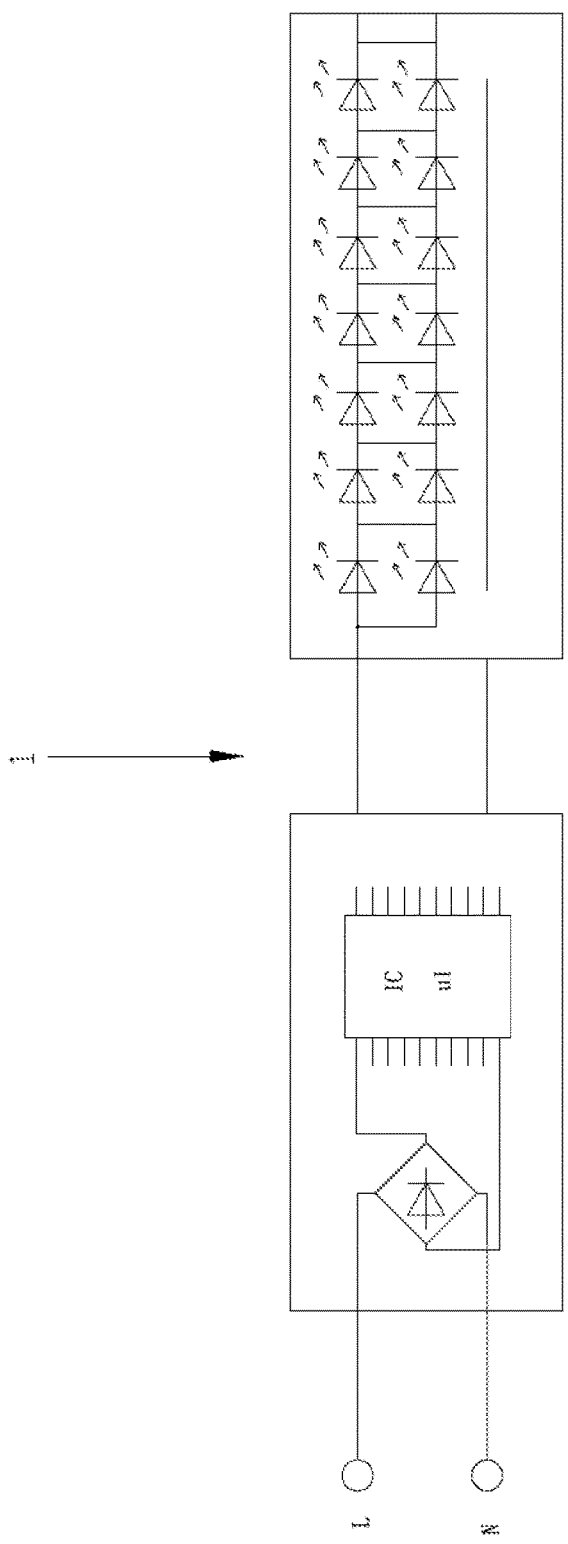
FIG. 2 shows a simple schematic view of the present invention.

Referring to FIGS. 2~8, the present invention discloses an LED torchiere lamp with overheat and overvoltage protection functions, and more particularly to an LED torchiere lamp which includes a high-voltage input power source combining with an IC drive circuit without using a transformer and an electrolytic capacitor (as shown in FIG. 2), and which is driven by constant current. The present invention comprises primarily a high-voltage rectifying circuit 1 which rectifies high-voltage alternating current as high-voltage direct current. The functions of major elements of the high-voltage rectifying circuit 1 are described below:

1. F1—a fuse (250/1A) 110, which permits automatic shut-off to protect the circuit when a subsequent circuit is short-circuited;
2. R7 and R8—two chip resistors (22R) 120, which are used for surge (current) protection;
3. RV1—a varistor 130, which prevents the circuit from showing all kinds of transient voltage and absorbs the surge current;
4. D1—a chip bridge 140, which rectifies an AC supply mains as DC voltage;
5. D2—a chip diode 150, which protects the lumped circuit from ESD;
6. D3, D4, D5, D6—four chip diodes 150, which protect each LED from ESD;
7. R1, R2, R3, R4, R5, R6—six chip resistors (15R) 160, which modulate the current value at the IC output terminal;
8. C1, C2, C3—three chip capacitors 170, which are used as the filter capacitors at the IC supply terminal.

The pin numbers and names of the IC drive circuit of the present invention are described below:
1. VCH an overvoltage detection input terminal,
2. VSSA a common,
3. CS1 connecting to a current sensing resistor 1;
4. VSSB a ground,
5. REG5 a power source at 5V,
6. TS an overheat protection input terminal,
7. VSSB a ground,
8. CS2 connecting to a current sensing resistor 2,
9. VDIM an analog light dimmer signal input terminal,
10. PWM a PWM light dimmer signal input terminal,
11. DN8 a channel 8,
12. DN7 a channel 7,
13. DN6 a channel 6,
14. DN5 a channel 5,
15. VPP a high-voltage power source,
16. VPP_ID a single-wired electronic switch power-harvesting current control terminal,
17. DN1 a channel 1,
18. DN2 a channel 2,
19. DN3 a channel 3,
20. DN4 a channel 4.

Figure 3:
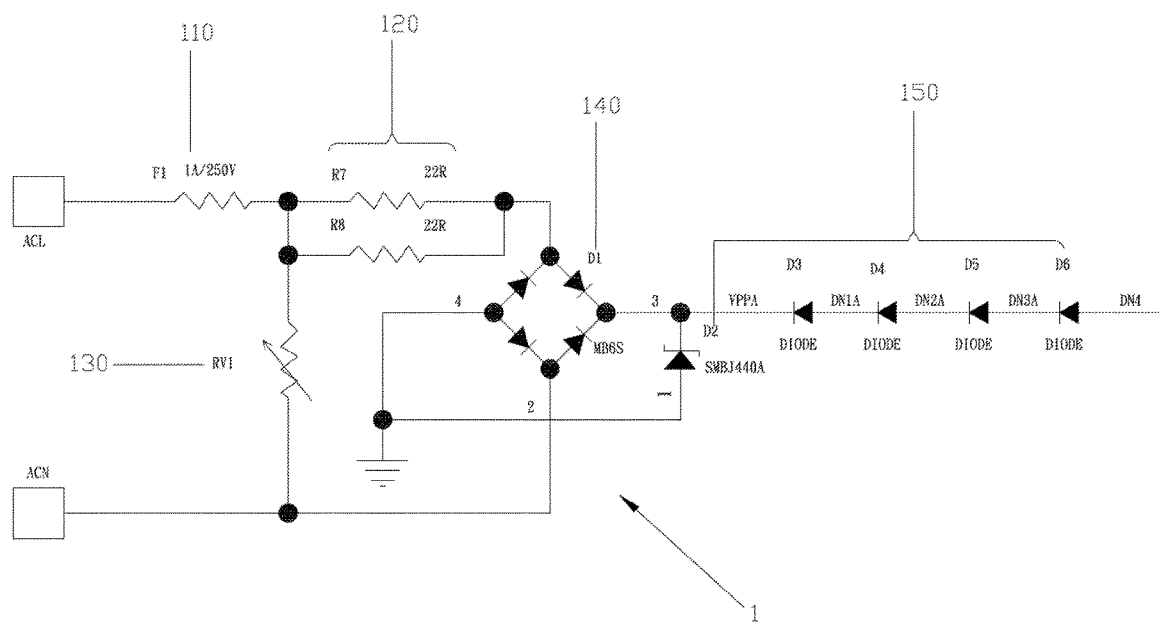
FIG. 3 shows a schematic view of a high-voltage rectifying circuit of the present invention.
Figure 4:
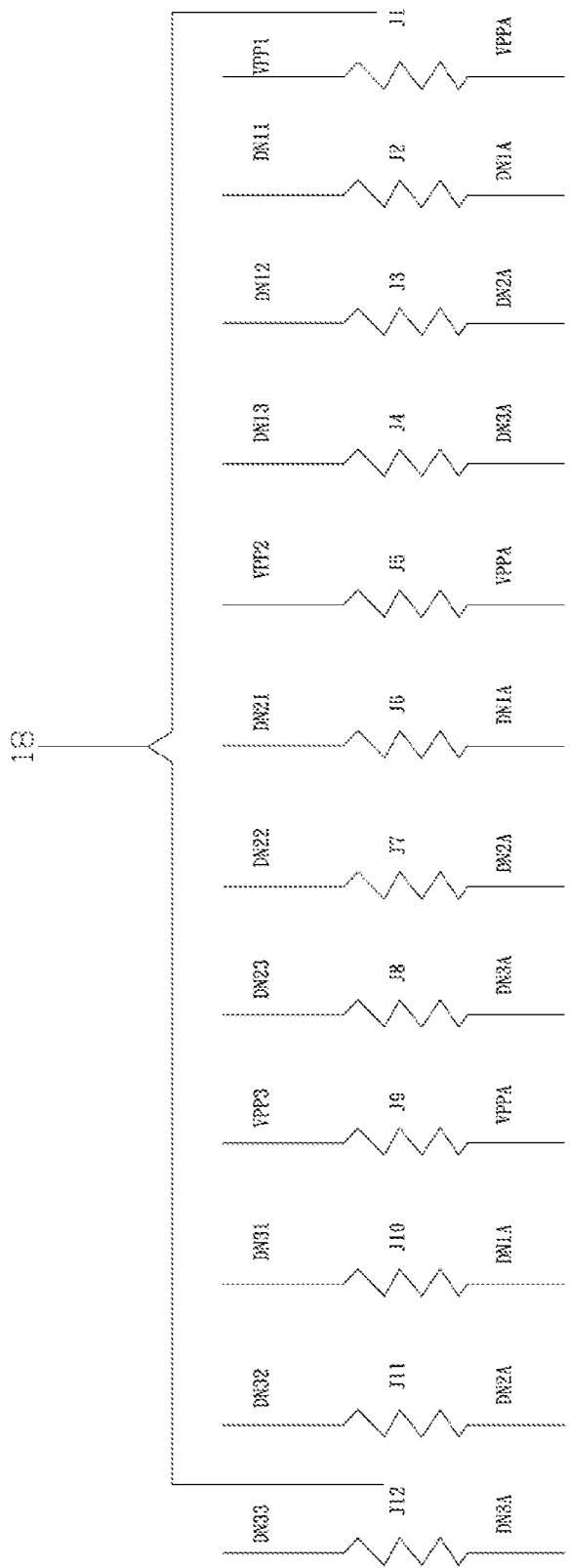
FIG. 4 shows a schematic view of a switching circuit of the present invention.
Figure 5:
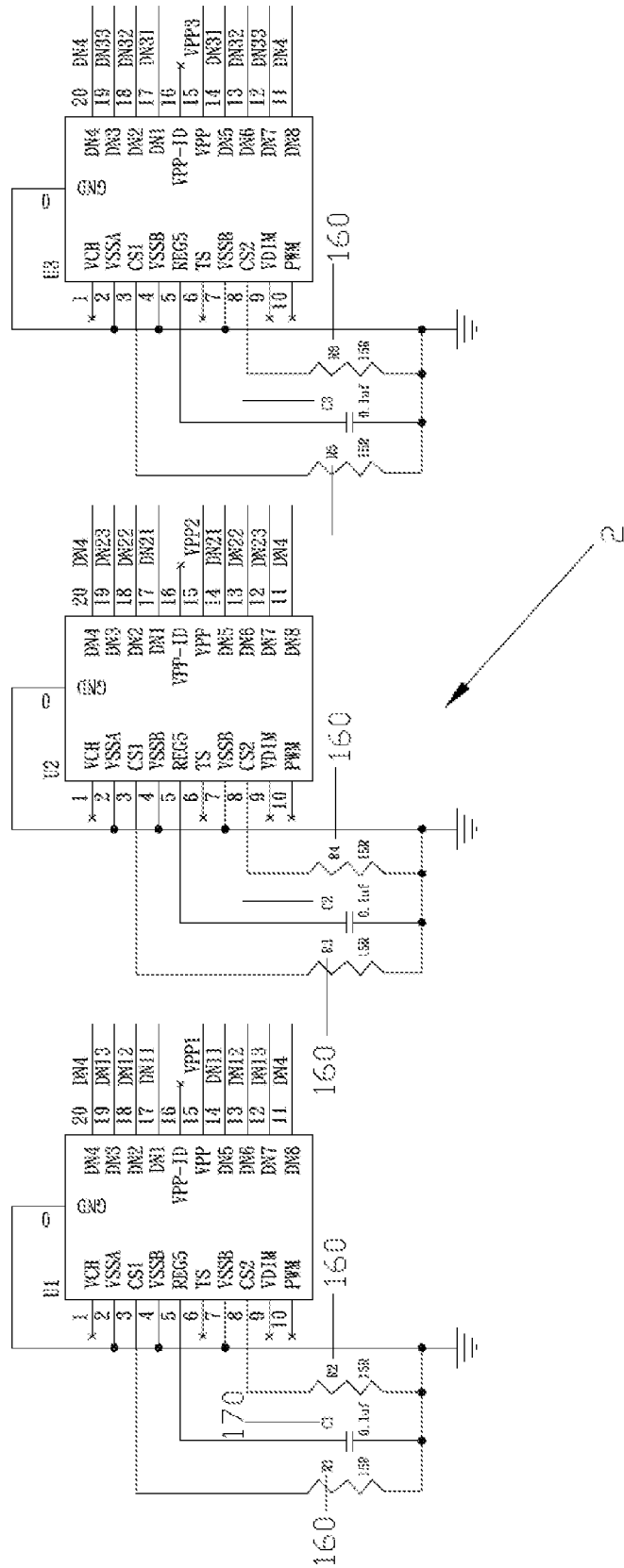
FIG. 5 shows a schematic view of pins of an IC drive circuit of the present invention.
Figure 6:
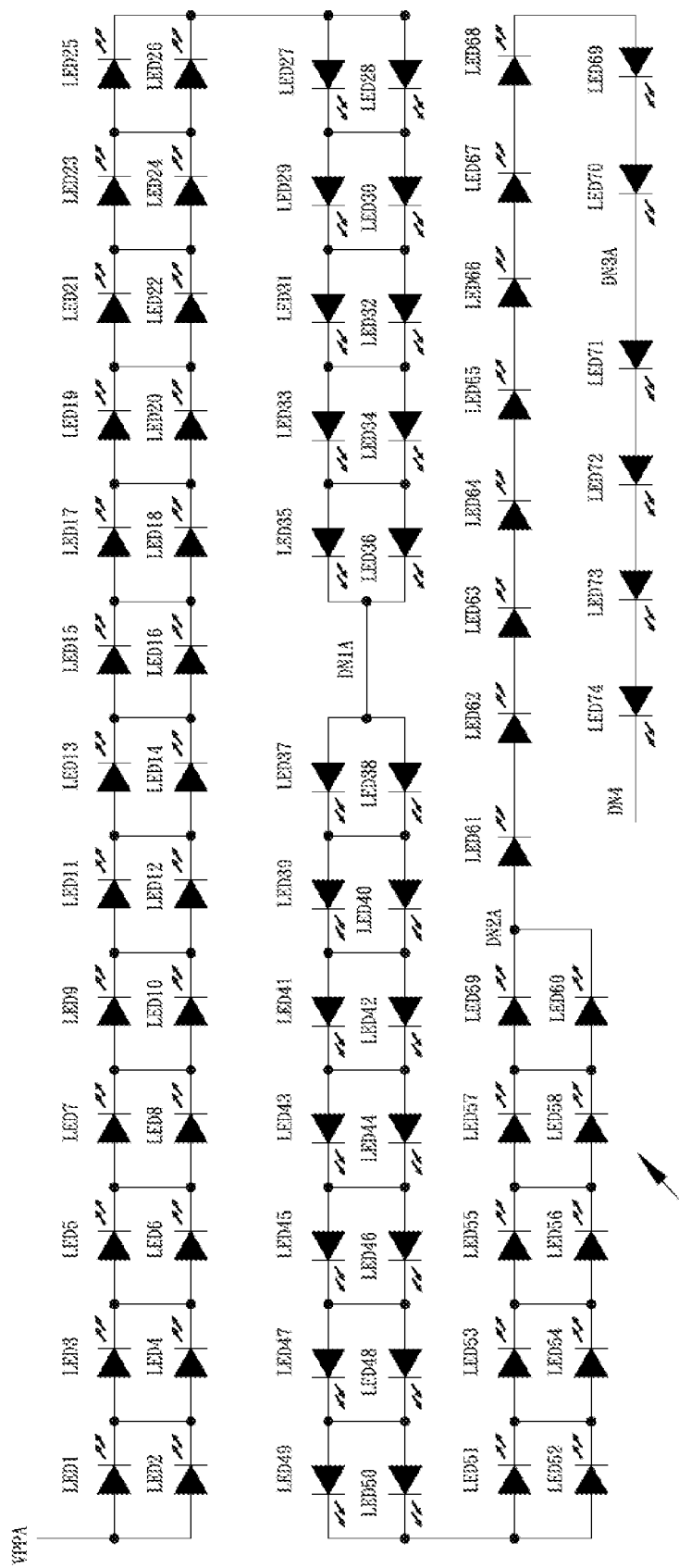
FIG. 6 shows a schematic view of the connection of an LED lamp at a load end of the present invention.

First of all, referring to FIGS. 3-6, the junctions VPPA, DN1A, DN2A, DN3A, DN4 of the high-voltage rectifying circuit 1 in FIG. 3 are connected to the junctions VPPA, DN1A, DN2A, DN3A, DN4 of the LED lamp 3 in FIG. 6, and the junctions of the high-voltage rectifying circuit 1 are connected to the IC drive circuit 2 through the chip resistors 18 (OR) J1-J12 of the switching circuit, with the chip resistors 18 being used for the jumper protection. The junction VPPA of the high-voltage rectifying circuit 1 is connected to VPP1, VPP2, VPP3 of the $15^{th}$ pin of U1, U2, U3 of IC drive circuit 2 through the chip resistors 18 J1, J5, J9, and then a high-voltage power source is introduced, connecting DN1A to the $14^{th}$ pin and the $17^{th}$ pin of U1, U2, U3 of IC drive circuit 2 through the chip resistors 18 (OR) J2, J6, J10, wherein the $14^{th}$ pin and the $17^{th}$ pin are DN11, DN21, DN31. DN2A is connected to the $13^{th}$ pin and the $18^{th}$ pin of U1, U2, U3 of IC drive circuit 2 through the chip resistors 18 (OR) J3, J7, J11, wherein the $13^{th}$ pin and the $18^{th}$ pin are DN12, DN22, DN32. DN3A is connected to the $12^{th}$ pin and the $19^{th}$ pin of U1, U2, U3 of IC drive circuit 2 through the chip resistors 18 (OR) J4, J8, J12, wherein the $12^{th}$ pin and the $19^{th}$ pin are DN13, DN23, DN33. Accordingly, the high-voltage rectifying circuit 1 can be connected to the IC drive circuit 2. There can be one or plural IC drive circuits 2 depending upon the quantity of the loaded chip LED lamps 3. The IC drive circuit 2 is built in with an electronic switching circuit required for driving the LED lamp 3, an analog light dimmer circuit and a PWM light dimmer circuit, in addition to an overheat and overvoltage protection circuit which is connected externally to R1, R2 for modulating the IC output current and to C1 for providing a stable filtering wave as supply power to IC drive circuit 2. Constant current is provided to the LED lamp 3 through the high-voltage rectifying current 1 and the IC drive circuit 2. When the temperature of the LED lamp 3 exceeds a temperature setting of 85~95° C., the overheat and overvoltage protection circuit starts to drop the voltage and decrease the current to cool down and reduce the brightness of the LED lamp 3. Therefore, the safety of the LED torchiere lamp is improved and the lifetime of usage of the LED torchiere lamp is extended, thereby having the practicality.

Another embodiment of the present invention is to provide an LED torchiere lamp with overheat and overvoltage protection functions, wherein the overvoltage detection input terminal VCH at the $1^{st}$ pin, the overheat protection input terminal TS at the $6^{th}$ pin, the analog light dimmer signal input terminal VDIM at the $9^{th}$ pin, the PWM light dimmer signal input terminal at the $10^{th}$ pin, and the single-wired electronic switch power-harvesting current control input terminal VPP_ID at the $16^{th}$ pin, disposed on the IC drive circuit 2, can be optionally connected or disconnected according to the required function, thereby facilitating the versatility of the present invention.

Figure 7:
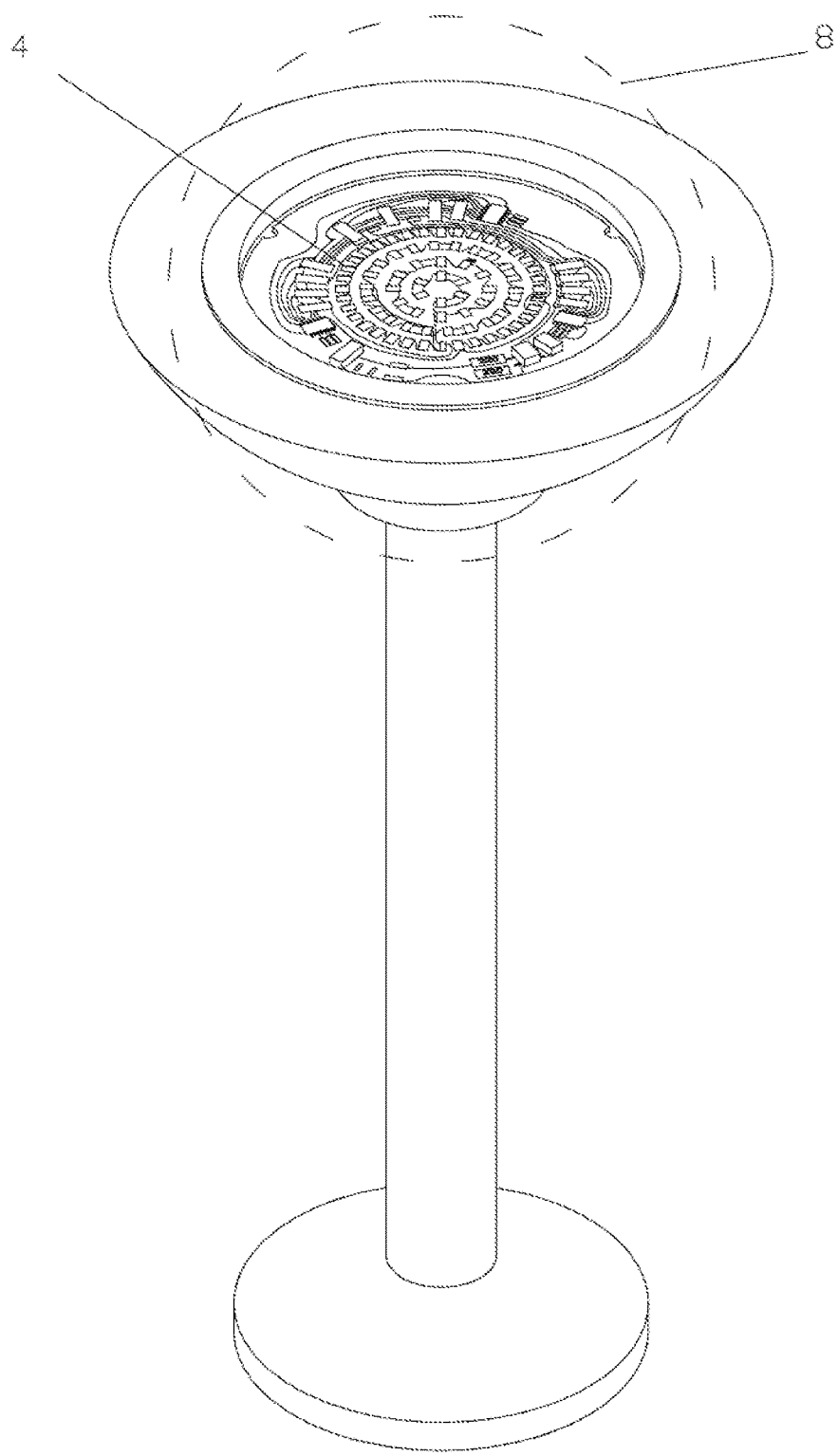
FIG. 7 shows a schematic view of installation of circuits and elements of the present invention.
Figure 8:
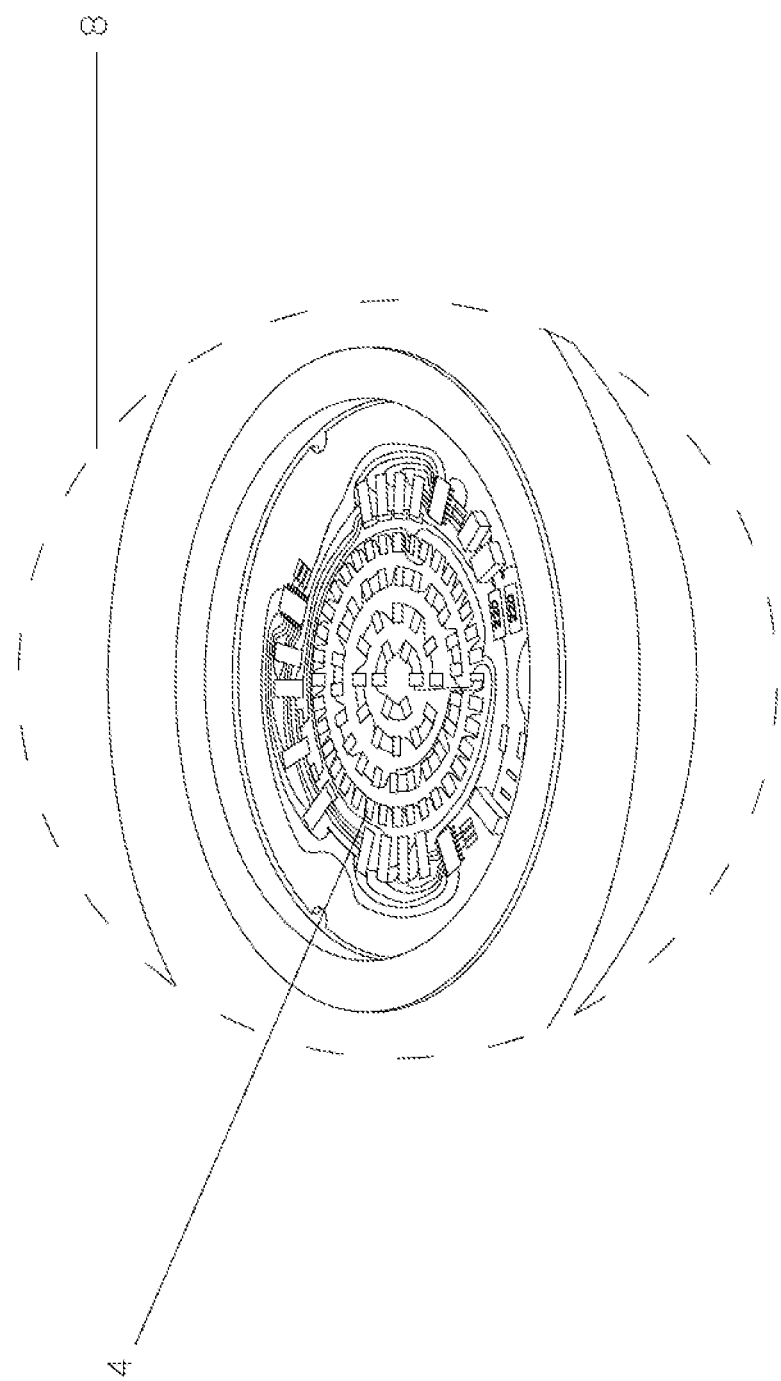
FIG. 8 shows a partially enlarged schematic view of the installation of circuits and elements of the present invention.

Still another embodiment of the present invention is to provide an LED torchiere lamp with overheat and overvoltage protection functions, wherein all the circuits and elements of the high-voltage rectifying circuit and the IC drive circuit are installed on a single PCB (Printed Circuit Board) 4 (as shown in FIG. 7 and FIG. 8) which is disposed on a top of the torchiere lamp to reduce the area of installation.

By connecting the high-voltage rectifying circuit 1 with the IC drive circuit 2, constant current is provided to the LED lamp 3 without using the conventional transformer or electrolytic capacitor, and with the overhead and overvoltage protection functions. Accordingly, the safety of the LED torchiere lamp is improved and the lifetime of usage of the LED torchiere lamp is extended, thereby having the practicality.

It is to be understood that the above description and drawings are only used for illustrating some embodiments of the present invention, not intended to limit the scope thereof. Any variation and deviation from the above description and drawings should be included in the scope of the present invention.

What is claimed is:

1. An Light Emitting Diode (LED) torchiere lamp with overheat and overvoltage protection functions, comprising:
   a high-voltage rectifying circuit, wherein the high-voltage rectifying circuit rectifies high-voltage alternating current as high-voltage direct current; and
   an Integrated Circuit (IC) drive circuit, wherein one or plural IC drive circuits is configured depending upon a quantity of a loaded chip LED lamps,
   wherein the high-voltage rectifying circuit is connected with the IC drive circuit without using a conventional transformer or an electrolytic capacitor,
   wherein constant current is provided to the LED lamp through the high-voltage rectifying circuit and the IC drive circuit,
   wherein when a temperature of the LED lamp exceeds a set temperature, a voltage of the LED lamp is dropped and a current in the LED lamp is decreased to cool the LED lamp to reduce brightness, and
   wherein the IC drive circuit is built in with an electronic switching circuit, an analog light dimmer circuit, and a Pulse Width Modulation (PWM) light dimmer circuit.

2. The Light Emitting Diode (LED) torchiere lamp with overheat and overvoltage protection functions, according to claim 1, wherein all the circuits and elements of the high-voltage rectifying current and the IC drive circuit are installed on a single PCB (Printed Circuit Board) which is disposed on a top of the torchiere lamp.

3. The Light Emitting Diode (LED) torchiere lamp with overheat and overvoltage protection functions, according to claim 1, wherein the overheat and overvoltage protection circuit starts to drop the voltage and decrease the current when the temperature of the LED lamp exceeds temperature setting of 85~95° C., which cools down the LED lamp to reduce the brightness, thereby improving the safety of the LED torchiere lamp.

* * * * *